United States Patent [19]
Vaussard et al.

[11] Patent Number: 5,612,294
[45] Date of Patent: *Mar. 18, 1997

[54] SCLEROGLUCAN BASED DRILLING MUD

[75] Inventors: Alain Vaussard, Pau; Alain Ladret, Saint-Gaudens; Alain Donche, Jurancon, all of France

[73] Assignee: Elf Aquitaine, Courbevoie, France

[*] Notice: The portion of the term of this patent subsequent to Nov. 3, 2014, has been disclaimed.

[21] Appl. No.: 373,494

[22] Filed: Jan. 17, 1995

Related U.S. Application Data

[63] Continuation of Ser. No. 78,778, Jun. 21, 1993, abandoned, which is a continuation of Ser. No. 688,055, Apr. 19, 1991, abandoned.

[30] Foreign Application Priority Data

Apr. 19, 1990 [FR] France ................... 90 05021

[51] Int. Cl.$^6$ ............................................. C09K 7/02
[52] U.S. Cl. ........................................ 507/110; 507/213
[58] Field of Search ................................ 507/110, 213, 507/211; 106/208

[56] References Cited

U.S. PATENT DOCUMENTS

| | | | |
|---|---|---|---|
| 3,301,848 | 1/1967 | Halleck et al. | 260/209 |
| 4,412,925 | 11/1983 | Ballerini et al. | 252/8.551 X |
| 4,561,985 | 12/1985 | Glass, Jr. | 252/8.5 |
| 5,306,340 | 4/1994 | Donche et al. | 106/208 |

FOREIGN PATENT DOCUMENTS

| | | |
|---|---|---|
| 0216661 | 4/1987 | European Pat. Off. . |
| 2570754 | 3/1986 | France . |

OTHER PUBLICATIONS

Gray et al, *Composition and Properties of Oil Well Drilling Muds* (Houston, Gulf Publishing Co., 1980) pp. 536–547 TN 871.2 G695.

World Oil's 1990 Guide to Drilling, Completion, and Workover Fluids, *World Oil*, Jun. 1990, pp. 69–108.

*Primary Examiner*—Philip Tucker
*Attorney, Agent, or Firm*—Birch, Stewart, Kolasch & Birch, LLP

[57] ABSTRACT

Base composition for water-based drilling muds allowing the number and the amount of the other constituents of the mud to be restricted. In addition to the base solvent, fresh water, sea water or salt water, the said base composition comprises scleroglucan as viscosity agent, the mycelium which produced it and bentonite or an equivalent in limited amount.

15 Claims, 11 Drawing Sheets

SCLEROGLUCAN BASED DRILLING MUD

This application is a continuation of application Ser. No. 08/078,778 filed on Jun. 21, 1993 now abandoned, which is a continuation of Ser. No. 07/688,055, filed on Apr. 19, 1991, now abandoned.

BACKGROUND OF THE INVENTION

1. Field of the Invention

The present invention relates to a water-based drilling mud comprising a minimum of constituents, including a known biopolymer obtained by fermentation, known as scleroglucan, which contains, in particular, the cellular residues of the producing organism.

2. Description of the Related Arts

Drilling mud is a more or less complex mixture most often based on a water-based or oil-based colloidal suspension used for drilling wells. This mud, injected into the succession of drill pipes, circulates by means of an ascending movement in the annular space enclosed between the walls of the geological formations drilled and the succession of pipes. It has multiple functions: in addition to cooling and lubricating without corroding the drilling tool, the mud must be able to raise to the surface the cuttings stripped from the formations. For this purpose it is necessary for the mud to be sufficiently viscous and for its lift to be such that the cuttings is able to remain in suspension in the mud when the flow rate of the latter is zero. The density of the mud must be sufficiently high so as to equilibrate the pressure in the pores of the formations and thus to prevent the formation fluids invading the well. However, this density must not be too high so as not to penalise the progress of drilling, or to fracture the formations.

Another function of the mud is to maintain the wall of the well such that there is no collapse. This function is usually ensured by virtue of the formation of a deposit of a skin of clay particles contained in the mud, this deposit being termed "cake" and covering the wall of the well. The quality of the cake is dependent on the components of the mud and must be suited to the nature of the terrains drilled and of their reactivity. A good quality cake not only permits the wall to be maintained but also permits a filtration control such that the ingress of water and/or mud into the formations is limited. However, plugging of the formations and in particular of the productive formations must be avoided.

A good quality mud must also be inert with respect to the formations which it passes through, in particular if the latter contain salts or reactive clays. Too high a reactivity of the components of the mud with the components of the formations in fact gives rise to reductions in the quality of the wall of the well and a pollution of the mud such that its physical characteristics, such as, for example, its viscosity, are modified, with the consequence that it is no longer able to perform its functions.

The multiple functions of the mud, some of which are antinomic, are the reason why a large variety of muds currently exists. These muds are usually highly complex mixtures of from two to ten or more constituents, the composition of which changes, becoming more complex as drilling progresses, and the use of which necessitates the involvement of specialists. The role of the specialist is to define the mud composition at the start of drilling and to monitor the physical and physico-chemical properties of the mud during operation in order to maintain the said properties and/or to adapt them permanently to the drilling conditions by adding suitable compounds, such as agents for increasing the weight, filtration-reducing agents, viscosity agents, thinners, plugging slurry or lubricants, anti-fermenting agents, neutralising agents and other specific or chemical compounds.

Inorganic colloids increase the viscosities and gelling. Bentonite, for example, which is often used in muds based on fresh water, also contributes to the formation of a cake protecting the walls of the well against collapse and assists in controlling the filtrate.

Among the organic colloids, some are used as filtration-reducing agents, others as viscosity agents and yet others as thinners. The introduction of thinners into the mud composition is necessary when the viscosities increase substantially under the effect of an increase in the clay loading, for example.

Carboxymethylcellulose (CMC), for example, which is a colloid derived from cellulose, is commonly used as additive when it is necessary to improve the carrying capacity of the mud by increasing the apparent viscosity. An improvement in the carrying capacity by means of such a procedure is offset by an increase in pressure loss. Cellulose derivatives, amongst other compounds, may also be present in the composition of the muds as fluid loss reducers.

Electrolytes or other chemical compounds may also be introduced into the composition of the mud, in order to modify the pH, such as sodium hydroxide for example, or in order to neutralise the reactions between the components of the mud and those of the formations.

It is well known that biopolymers may be present in the composition of a mud as a viscosity agent. Apart from remarkable viscosity-improving properties, the biopolymers customarily used for drilling muds have a good compatibility with filtering agents and are also biodegradable, which has the effect of reducing the problems of clogging and removal of pollutant waste.

The quoted document U.S. Pat. No. 4,561,985 describes drilling muds in which either a water-soluble nonionic polysaccharide, selected from the family of cellulose derivatives or guar derivatives, or a water-soluble anionic polysaccharide, selected from the group of carboxymethylcelluloses or the group of polysaccharides obtained from Xanthomonas campestris, or a mixture of these polysaccharides is incorporated as the viscosity agent.

Xanthan in particular is an anionic heteropolysaccharide obtained by fermentation from the action of a microorganism of the Xanthomonas type. Its molecular weight exceeds one million and it is currently very often used in the composition of drilling muds. This hydrophilic colloid not only has the property of thickening but also of stabilising the water-based systems and conferring on them a particularly high viscosity of the order of 1.4 to 1.6 Pa.s measured at 30 rev/min on a Brookfield rheometer for a solution containing 10% by weight of xanthan, in the presence of 5 g/l of NaCl. In addition it has low sensitivity to significant variations in temperature, pH or salinity.

However, the introduction of xanthan into the composition of a drilling mud as the viscosity agent does not enable the other constituents usually needed in the mud composition in order to ensure its other functions to be dispensed with.

Scleroglucan is another polysaccharide produced by fermentation of a fungus of the Sclerotium type, some applications of which are known in the petroleum field. Thus, the quoted document EP 0216661A1 describes an application of scleroglucan in the field of assisted recovery of petroleum.

The quoted document FR 2,570,754 cites other possible applications of this product in the field of the treatment of hydrocarbon wells, in particular as completion fluid or cleaning agent for oil or gas transport pipes or as fracturing fluid.

Some properties of scleroglucan are known. Thus, scleroglucan, like xanthan, is a hydrophilic colloid which has the property of thickening and stabilising water-based systems by conferring on them a particularly high viscosity, higher than that obtained in the case of xanthan for identical concentrations of active compounds, and in particular a high independence of these viscosities with respect to variations in pH and temperature within a very wide range, and also rheological properties of the pseudoplastic type. Thus, the viscosity of a scleroglucan solution is virtually independent of the pH between pH 1 and pH 12.5 and of the temperature up to a limit which is located in the vicinity of 130° C. With scleroglucan the viscosity is also highly independent of the salinity.

The xanthans or scleroglucans customarily used in the applications in the petroleum field are refined varieties which are in the form of a white powder obtained by alcoholic precipitation of a fermentation broth after filtration in order to remove the residues of the producing organism. It is customary in the known applications of biopolymers in the field of well treatments to purify or refine the liquid reaction mixture resulting from the fermentation and containing the biopolymer in question so as to separate off all or some of the residues which it contains, by filtering or centrifuging or concentrating the said reaction mixture, so that the treatment agents do not contain more than 10 to 15% of the said residues, consisting of mycelium in the case of scleroglucan.

Xanthan is produced by a bacterium which has a size of only a few nanometers. The fibrous and crosslinked scleroglucan mycelium is of macroscopic size. Even after grinding, the cellular residues remain of the order of one millimeter.

SUMMARY OF THE INVENTION

It has now been found that by using scleroglucan to make up at least part of the viscosity agent for drilling mud, it was possible to reduce the concentration of the other constituents of the mud or even to suppress them. In fact, the introduction of scleroglucan as main constituent permits the preparation of a water-based mud containing a minimum of constituents ensuring its functions in a satisfactory manner in a large number of cases, especially if the scleroglucan used contains all or part of the mycelium which produced it, to the extent that the presence of this mycelium in the mud improves some of the functions of the latter. Thus, for example, a mud containing non-refined scleroglucan appears to preserve the sub-terranean formations better than a mud containing refined scleroglucan or a any drilling mud having similar physical and chemical characteristics. The sub-terranean formations is then less sensitive to the effect of erosion and mechanical destruction and the presence of mycelium allows a better preservation of the walls of the well and, in a way, inhibits the reaction of the clays in the formations.

The mycelium suspended in the scleroglucan mud may even play the role of plugging agent in certain cases.

Moreover, the presence of the mycelium modifies the interaction between the polymer and the solids and makes the viscosity of a solution containing non-refined scleroglucan even less sensitive to the clay content.

It is also found that the presence of mycelium improves the control of the filtrate and in certain cases may even avoid the specific use of a filtration-reducing agent, or at least allow the useful amounts thereof to be reduced.

The presence of scleroglucan gives rise to an encapsulation phenomenon of the reactive clays, for example contained in the mud, and the presence of mycelium, in combination with the excellent carrying capacity of the suspensions containing scleroglucan, promotes the removal of cuttings originating from drilling, which agregates and renders the screening or the removal by mechanical means at the surface more effective. In fact, in the presence of mycelium the phenomenon of crumbling in a mud containing scleroglucan is not observed. It appears, as another observed phenomenon, that the cuttings raised to the surface by the mud during drilling is in a cruder and therefore better preserved state with a mud containing non-refined scleroglucan than with a mud of a different nature and is therefore of greater value to the geologists who study it.

DETAILED DESCRIPTION OF THE INVENTION

Figure 1:
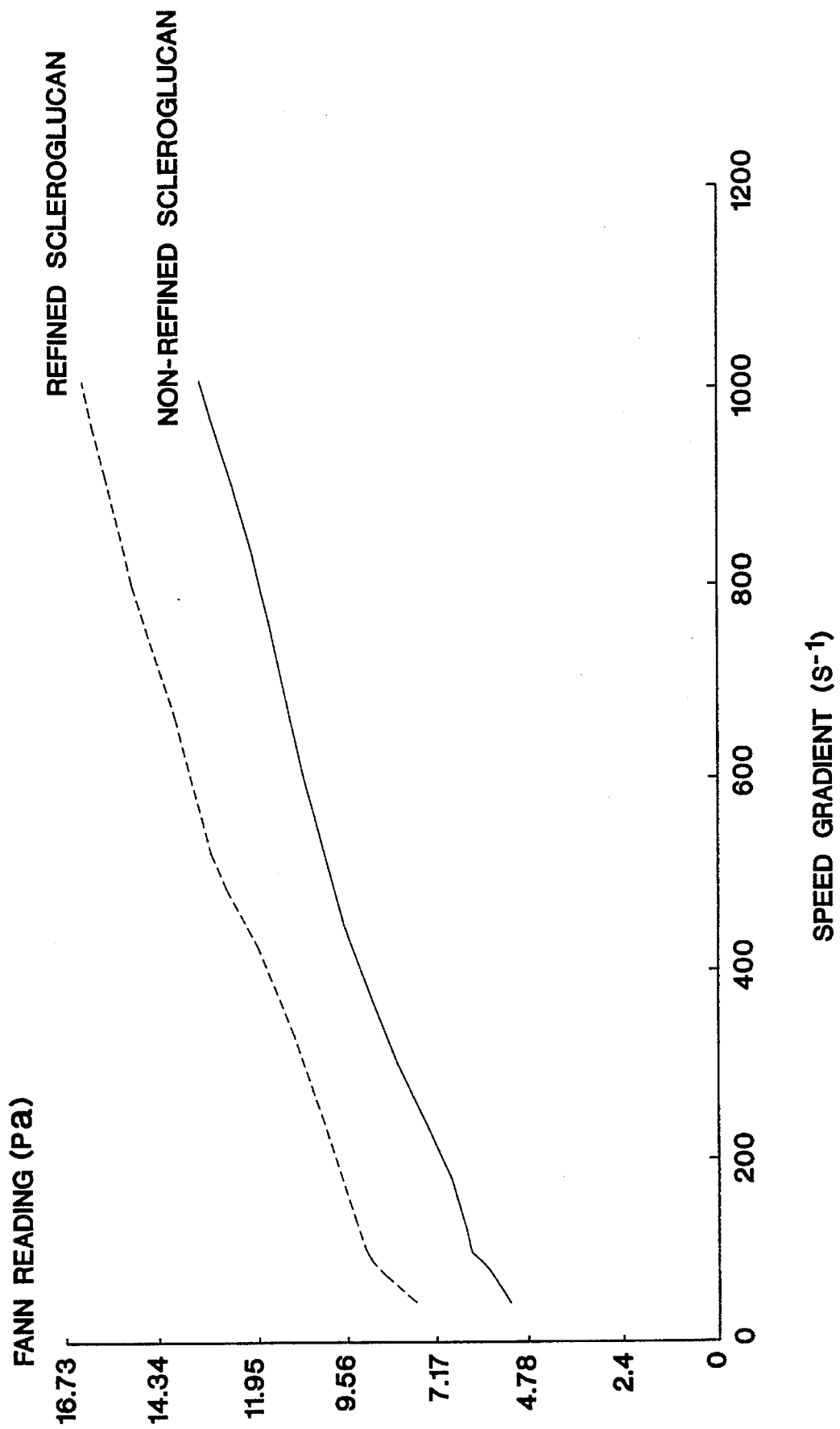
FIG. 1 is a graph of the results produced in Example 1.

The subject of the invention is therefore a base composition for drilling mud comprising at least of a useful amount of scleroglucan in order to obtain the desired viscosity, mixed with a production water, which may be fresh water, sea water or brine or any other type of water (hard water or water containing calcium or magnesium salts etc.), a non-reactive inorganic colloid in an amount which may vary from 0 g/l to 50 g/l and, if necessary, a bactericide in an amount sufficient to prevent any biodegradation phenomenon. The amount of bactericide, which is less than that of scleroglucan, may, for example, represent between 0% and 0.5% of the weight of the composition according to the invention. The bactericide, for example of the PROXEL type, marketed by ICI, will be introduced into the composition according to the invention for operations which will last, for example, more than two or three days, in order to control bacterial degradation and its effects.

The scleroglucans, which are present in the composition of muds according to the invention, are nonionic water-soluble homopolysaccharides having molecular weights in excess of 500,000, the molecules of which consist of a main straight chain formed of D-glucose units which are bonded by β-1,3 bonds and one in three of which is bonded to a side D-glucose unit by means of a β-1,6 bond. These polysaccharides are obtained by fermentation of a medium based on sugar and inorganic salts under the action of a microorganism of Sclerotium type. A more complete description of the scleroglucans and their preparation may be found in the quoted document U.S. Pat. No. 3,301,848, the contents of which are incorporated by reference in the present description. In aqueous solution, the scleroglucan chains are combined in a triple helix, which explains the high rigidity of the biopolymer and consequently its high viscosity-increasing power and its resistance to shearing stress.

According to the invention, it is possible to use, as source of scleroglucan, the scleroglucan isolated from the fermentation medium, the said product being in the form of a powder or of a more or less concentrated solution in an aqueous and/or aqueous-alcoholic solvent, or to use the liquid reaction mixture resulting from the fermentation and containing the scleroglucan in solution. According to the invention, further suitable scleroglucans are the modified scleroglucans resulting, for example, from the treatment of scleroglucan with a dialdehyde reagent, such as glyoxal, the said treatment being carried out, for example, by bringing the scleroglucan into contact, in solution, in suspension or essentially dry, with 0.5% to 10% by weight of the dialdehyde reagent, relative to the scleroglucan.

Preferably, the scleroglucan present in the composition of the mud according to the invention will contain all or part of the mycelium of the producing fungus. Advantageously, the scleroglucan present in the composition of the mud according to the invention will contain more than 15% by weight of mycelium.

Advantageously the base composition for the mud according to the invention will contain 1 g/l to 10 g/l of scleroglucan and preferably 2 g/l to 5 g/l of non-refined scleroglucan.

Advantageously, in order to ensure better filtration control, the base composition of the drilling mud according to the invention contains an inorganic colloid such as bentonite or micronised calcium carbonate, the particle size of which has been adapted, preferably between $5 \times 10^{-6}$ m and $100 \times 10^{-6}$ m, in proportions less than are usual for water-based drilling muds in which the viscosity agent consists of a biopolymer other than the scleroglucan. In the composition according to the invention, the proportion of bentonite is preferably between 0 g/l and 30 g/l and the proportion of micronised calcium carbonate between 0 g/l and 50 g/l.

The water present in the mud composition may be of any type and of any pH. For example, it is possible to use fresh water, brine or even water to which any salt, such as an alkali metal salt or alkaline earth metal salt, such as sodium carbonate, sodium chloride, potassium chloride, etc., has been added.

Although this is not indispensable with the composition according to the invention, it may be necessary to adjust the pH of a drilling mud. An alkaline mud having a high pH has an anti-corrosive action and assists in the swelling of the reactive clays, which are a constituent of the mud, which is necessary for ensuring that the mud performs its functions as well as possible. Moreover, the majority of compounds or additives which it may be desired to add to the composition of a base mud have a better stability in an alkaline medium. A compound having an alkaline reaction, for example NaOH or KOH, will therefore advantageously be included in the base composition of a mud according to the invention, in a proportion such that the pH of the mud thus obtained is between 8 and 10 and preferably between 9 and 9.5.

The drilling mud according to the invention may also contain diverse additives more or less commonly used for the composition of drilling muds.

A composition of this type according to the invention, containing, in solution, in suspension or in colloidal solution in any production water, scleroglucan in a sufficient amount and an inorganic colloid in a small amount, to which a base and/or a bactericide has been added if appropriate, constitutes a base composition for ready-to-inject drilling mud having certain advantages. A composition of this type may itself constitute a drilling mud which is used as such, to the extent that it ensures the main functions of a mud such as viscosity agent, transport agent, filtration-control agent and encapsulating agent.

A composition according to the invention provides a very good viscosity agent, necessitating smaller amounts of viscosity agent than those customarily used, and which is also insensitive to variations in pH, temperature, salinity and clay content. Moreover, if the scleroglucan present in the composition is non-refined, a composition is obtained which ensures correct control of the filtrate, good preservation of the walls and good cleaning of the well without penalising the rate of progress of drilling.

The use of this composition in fact makes it possible to economise on the amount of compounds used, such as the viscosity agent or the inorganic colloid. By way of example, the amount of bentonite necessary for a water-based mud in which the viscosity agent is xanthan is conventionally between 20 and 50 grammes per liter, whereas in the composition according to the invention amounts not exceeding 30 grammes per liter suffice in order to obtain equivalent effects. Similarly, in some cases it may be possible to restrict and even suppress the use of cellulose derivatives used as plugging agent, the mycelium contained in the composition according to the invention at least partly ensuring this function. Similarly again, the use of PAC (polyanionic cellulose) or of CMC used in order to increase the apparent viscosity at low transport speeds and to improve the carrying capacity to achieve better removal of the waste is no longer justified when the composition according to the invention is used.

Similarly, finally, the use of some chemical products to treat some pollution by NaCl or calcium salts for example is no longer necessary with the composition according to the invention, because of its greater tolerance of the said pollution.

Apart from the fact that this mud contains a limited number of constituents which are simple to use, this mud may be used without any particular precautions in a wide range of wells and for drilling any type of formation and is more particularly suitable for drilling at high temperatures and/or using salted muds.

A high temperature is understood to be temperatures which may reach 120° C. In the case of temperatures going beyond this limit, irreversible gelling phenomena may appear after a certain ageing of the order, in the laboratory, of 16 h for a temperature T=140° C. and of more than 100 h for T=120° C. The phenomenon is produced, for example, for 5 g/l solutions in fresh water which is either alkaline or quasi-saturated with sodium chloride or calcium chloride, or in the presence, and only in the presence, of solids. In a solid-free solution, the polymer degrades without gelling at temperatures higher than T=130° C.

The base composition for drilling mud according to the invention is prepared by mixing, with stirring, the scleroglucan, which may be in any form, solid or solution or suspension, in appropriate amounts to obtain the abovementioned concentrations, with the amount of water necessary for the production of the mud. As a general rule, it is recommended to prepare a solution containing 1% of scleroglucan, which after stirring for 20 minutes is brought to the desired concentration. The mechanical stirring must be sufficiently vigorous to supply the indispensable shearing stress, while avoiding the inclusion of air. It is pointed out that this shearing stress, which is necessary to achieve a good dispersion, improves the viscosity, in contrast to the majority of known colloids. After swelling, the solution is brought to the desired concentration. If a viscosity higher than 0.1 Pa.s is desired, the concentration must be higher than 0.5% by weight. The respective amounts of inorganic colloid and bactericide, if used, added to the water are chosen such that the concentrations of these constituents in the resulting suspension are within the ranges defined above. The amount of the compound having an alkaline reaction, if used, is adjusted so to bring the pH of the suspension to the chosen value. The constituents, that is to say the scleroglucan, the inorganic colloid and, if appropriate, the bactericide and the compound having an alkaline reaction which are added to the water may be added in any order. However, it is preferable first to dissolve the compound having an alkaline reaction, if this compound is, in particular, sodium hydroxide or potassium hydroxide, in the water intended to form the aqueous phase of the suspension before incorporating the inorganic colloid, then the agent based on scleroglucan and finally the bactericide into the solution obtained.

Compared with a composition containing xanthan in an equal amount, the composition according to the invention has some advantages. Apart from a very good viscosimetric yield, at least equal to that of a composition containing xanthan, the composition according to the invention has very good stability within a wide pH range and better temperature stability, at least up to 120° C., its rheological characteristics remaining stable at this temperature whereas, when aged for 16 h at 120° C., a solution containing 5 g/l of the xanthan Rhodopol XB23 from Rhône Poulenc, for example, loses all of its viscosity-increasing properties, both in fresh water and in sea water. In the presence of mycelium it will be preferred, however, to work in a neutral or alkaline medium. It has also been found that the compositions according to the invention have a good stability in the presence of significant clay content of up to 150 g/l and more, in respect of clays of low reactivity, to the extent that the rheological characteristics of these compositions remain weak in the presence of loading and comparable to those of an uncontaminated base solution, in contrast to what occurs in the case of xanthan-based compositions.

In the presence of reactive clay, such as the bentonite CLARSOL FB2 or attapulgite, the effect produced in the compositions based on non-refined scleroglucan is that of encapsulation of these clays in the form of small aggregates which can be destroyed by violent agitation or shearing stress.

It has also been found that the compositions according to the invention have good stability to electrolytes, the polymer withstanding sodium chloride or potassium chloride salinities of 120 g/l without any problem, with slight variations in the rheological characteristics, including in the presence of clay loading. The filtrate control is appropriate in the presence or absence of diverse reactive clays and of diverse contaminations by electrolyte or calcium for example. Experiments carried out on samples based on fresh water or salt water show that these results are virtually independent of the type of water used. The filtrate control, however, appears to be better in fresh water than in sea water, while supplementary contamination by sodium chloride, calcium chloride or clays for example appears to be better withstood from the rheological standpoint by the polymer in sea water rather than by that in fresh water.

The base compositions for drilling mud according to the invention are very particularly suitable for the drilling of any type of well whatever the field of application, for example petroleum, mining, civil engineering or any other field of application, for example drilling for water.

The invention is illustrated by the following examples which are given without any restriction being implied.

The equipment used for the measurements is standardised (API standard RP 13). The rheological behaviour of the solutions tested was evaluated using a FANN 35 viscometer with six speeds, that is to say 600—300—200—100—60 and 30 revolutions per minute (rev/min), each corresponding to a speed gradient expressed in reciprocal seconds ($s^{-1}$) of, respectively, 1020, 510, 340, 170, 85 and 51 $s^{-1}$. This apparatus provides a measurement of the direct shear strain, which is termed FANN reading, expressed here in Pascal. FANN is a make of equipment to which particular procedures are applied.

The FANN rheometer is an apparatus having coaxial cylinders, the rotor of which is driven with the aid of an electric motor (a mechanical rheometer also exists in which the rotor is driven by hand). The resistance to shear of the mud, contained in a beaker into which the coaxial cylinders are immersed, is measured. The resistance to shear at various speeds of rotation of the rotor is read off (FANN reading) on the graduated dial. The viscosity of the mud causes a rotation of the stator which is indicated on the reading dial.

The filtration measurements are carried out at the end of 30 minutes using an API filter press and are expressed in milliliters.

The scleroglucan used is produced by SANOFI BIO INDUSTRIES from a Sclerotium Rolfs ii strain. Two grades of scleroglucan are used in the following examples: a refined grade containing less than 10% of mycelium residues, marketed under the name ACTIGUM CS11, and a non-refined grade containing of the order of 25% of mycelium residues, marketed under the name ACTIGUM CS6. The xanthan used in the tests described below is marketed by RHONE POULENC under the name RHODOPOL XB23 (XB23 below) and contains about 90% of active substance. The scleroglucans were hydrated with stirring in the RAYNERI for 2 hours.

All of the following experiments were carried out using scleroglucan previously treated with 1 to 2% of wetting agent, that is to say a sorbitan ester, to facilitate hydration. The experiments were carried out on 5 g/l solutions in fresh water or sea water, without adjusting the pH, unless indicated to the contrary, obtained from the same base solution (preparation of a 20-liter sample for all the experiments).

EXAMPLE 1

The curves in FIG. 1 allow comparison of the viscosimetric behaviour, in FANN reading, of a refined scleroglucan and a non-refined scleroglucan for the same concentration, that is to say 5 g/l, in fresh water at pH 10.5. It is found that the efficiency for the refined scleroglucans is about 20% higher than that for the non-refined scleroglucans. This discrepancy is due to the sole difference in concentration of active compound between the scleroglucans tested.

EXAMPLE 2

Figure 2:
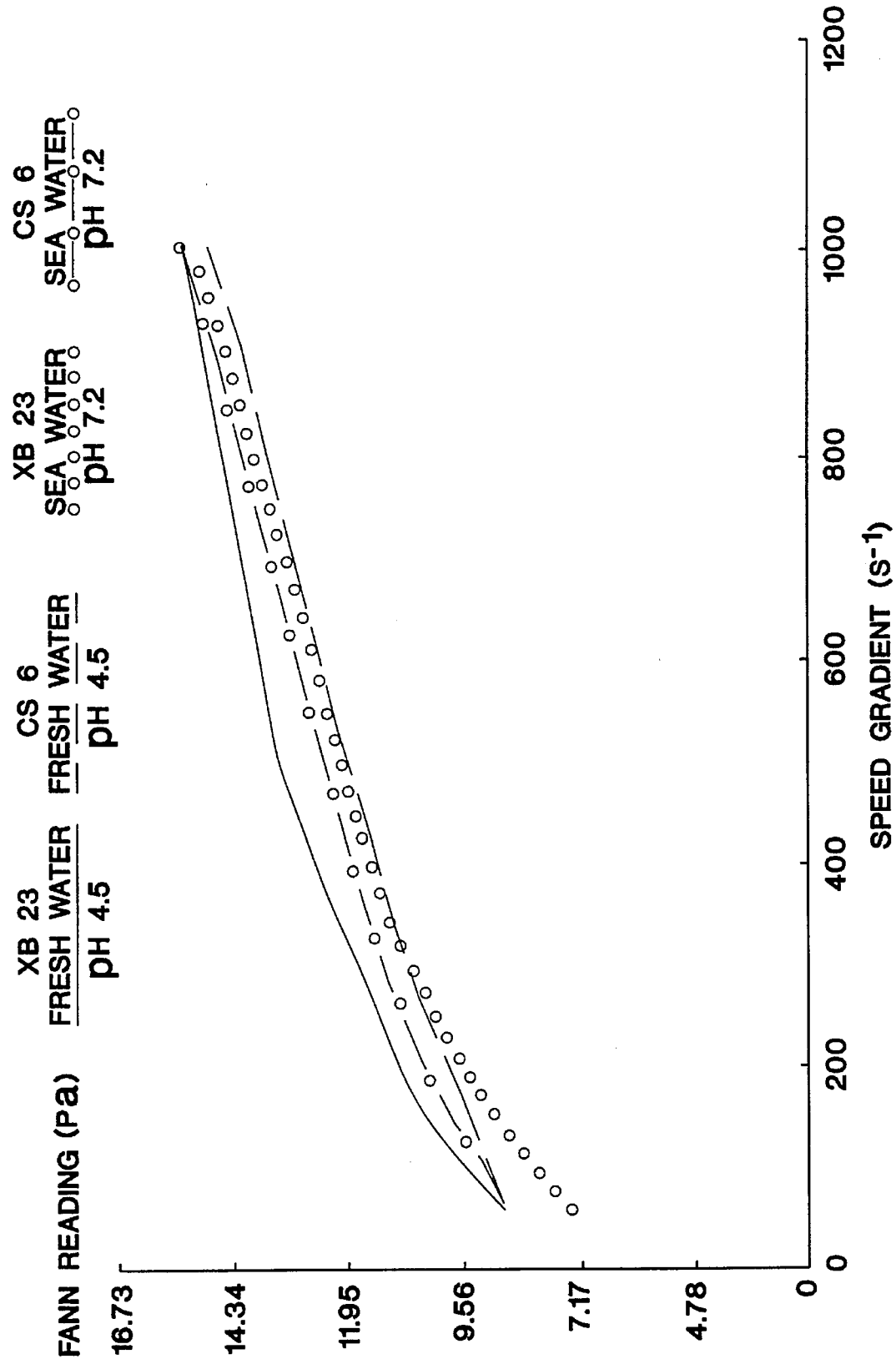
FIG. 2 is a graph of the results produced in Example 2.

The viscosimetric efficiency of a suspension of non-refined CS6 scleroglucan and a suspension of XB23 xanthan is compared for a given concentration of 5 g/l, on the one hand in fresh water at pH 4.5 and on the other hand in sea water of pH 7.2. The curves in FIG. 2 allow comparison of the results obtained in FANN readings. It is found that for an equal weight of active substance the efficiencies, in slightly acid fresh water, are largely equivalent and that in sea water the efficiency is better for the scleroglucan.

EXAMPLE 3

The viscosimetric behaviour of 5 g/l suspensions of non-refined CS6 scleroglucan in fresh water or in sea water is compared for various loadings of non-reactive clays. The suspensions were prepared and compared under the same conditions. The measurements were carried out for two different loading clays, that is to say crude clay CLARSOL FGN (smectite) and kaolinite, and for three different clay concentrations: 50, 100 and 150 g/l.

Table 1 allows comparison of the FANN readings of these suspensions having various loadings with the base suspension. The experiments were carried out for compositions based on a neutral fresh water on the one hand and compositions based on a sea water of pH 7.1 on the other hand.

than the other viscosity agents, to the extent that their viscosity remains controllable. The results given in Table 1 show a controllable but nevertheless sudden increase in viscosity for xanthan with the introduction of the clay loading, these increases necessitating successive dilution operations on site.

EXAMPLE 4

The filtrate reducing power of the scleroglucan was evaluated from an API standard test which consists in

TABLE 1

CLAY CONTENT FANN Lecture

CS6 5 g/l

| | Fresh water PH = 7 | | | | | | Sea water PH = 7,1 | | | | | | |
|---|---|---|---|---|---|---|---|---|---|---|---|---|---|
| | Base | FGN | | Kaolinite | | | Base | FGN | | | Kaolinite | | |
| | solution | 50 g/l | 100 g/l | 50 g/l | 50 g/l | 100 g/l | 50 g/l | solution | 50 g/l | 100 g/l | 150 g/l | 50 g/l | 100 g/l | 150 g/l |
| FANN 600 | 12,4 | 12,9 | 16,3 | 18,2 | 13,4 | 15,3 | 17,2 | 12,9 | 13,9 | 15,3 | 17,2 | 13,4 | 14,8 | 17,2 |
| FANN 300 | 9,6 | 9,6 | 12, | 12,9 | 10 | 11 | 12 | 10 | 10 | 11 | 12,4 | 9,6 | 10,6 | 12,4 |
| FANN 200 | 8,6 | 8,6 | 10 | 11, | 8,6 | 9,1 | 10 | 9,1 | 8,6 | 9,6 | 11 | 8,6 | 9,1 | 10,5 |
| FANN 100 | 7,2 | 7,2 | 8,1 | 9,1 | 6,7 | 7,2 | 7,6 | 7,6 | 7,2 | 7,6 | 8,6 | 7,2 | 7,2 | 7,6 |
| FANN 60 | 6,7 | 6,7 | 7,2 | 8,1 | 6,2 | 6,7 | 6,7 | 6,7 | 6,7 | 7,2 | 7,6 | 6,7 | 6,7 | 6,7 |
| FANN 30 | 6,2 | 5,7 | 6,2 | 7,2 | 5,7 | 5,7 | 5,7 | 6,2 | 5,7 | 6,2 | 6,7 | 5,7 | 5,7 | 5,7 |

XB23 5 g/l

| | Fresh water PH = 4,5 | | | Sea water pH = 7,2 | | |
|---|---|---|---|---|---|---|
| | Base solution | FGN 100 g/l | Kaolinite 100 g/l | Base solution | FGN 100 g/l | Kaolinite 100 g/l |
| FANN 600 | 13,4 | 18,2 | 13,9 | 11,9 | 20,6 | 19,1 |
| FANN 300 | 11, | 14,8 | 11,5 | 8,6 | 15,8 | 14,8 |
| FANN 200 | 10, | 12,9 | 10,5 | 7,2 | 13,4 | 12,9 |
| FANN 100 | 8,1 | 11,5 | 9,1 | 5,7 | 11 | 10,5 |
| FANN 60 | 7,6 | 10,5 | 8,1 | 4,8 | 9,6 | 9,6 |
| FANN 30 | 6,7 | 9,1 | 7,2 | 4,3 | 8,6 | 8,1 |

Very good rheological properties are found for the suspensions containing scleroglucan, the increase in the stresses read off being due to the sole increase in the solids content. A paradoxical fall in the viscosities of the suspensions containing non-refined scleroglucan compared with the base suspension without clay can even be observed for the lowest clay concentrations and the low degrees of shear stress. This effect is less pronounced for the non-refined scleroglucans than for the refined scleroglucans (measurements not reported) because of the presence of mycelium. The rheologies for kaolinite are comparable to those obtained for FGN. In sea water results are obtained which are comparable to those obtained in fresh water. No flocculation phenomenon of the clay suspension was observed.

Measurements were carried out after ageing for 16 hours at a temperature of 80° C. (measurements not reported in Table 1). It is found that ageing does not affect the rheology.

The viscosimetric behaviour of 5 g/l suspensions of XB23 xanthan in fresh water or in sea water was then compared for the same different loadings of the same non-reactive clays.

The experiments are carried out under the same conditions as those described above. It is known that the biopolymers show a better reaction to the increase in clay loading filtering a suspension of clay and scleroglucan using a WHATMANN 50 cellulose filter under a pressure of 7 bars. The volume of solution filtering through the cake of clay and polymer formed on the filter is measured as a function of time. The experiments were carried out on compositions based on fresh water containing either non-refined scleroglucan in a concentration of 7.5 g/l or refined scleroglucan in the same amount, on the one hand, and on compositions containing non-refined scleroglucan in a concentration of 5 g/l and FB2 bentonite in an amount of 20 g/l, on the other hand. In this latter case, the amount of scleroglucan was reduced to 5 g/l in order to bring the viscosities to comparable values for all of the experiments. In all cases, the pH was regulated by supplying sodium hydroxide or PTS200 so that the pH is equal to 10. The result obtained for the composition containing 5 g/l of CS6 and 20 g/l of bentonite was compared with that for a composition containing the same constituents, to which 4 g/l of CMC was added. The CMC is, in fact, commonly used in drilling fluids because it has a high filtrate-reducing power. These compositions containing scleroglucan were also compared with a composition containing XB23 xanthan in an amount of 5 g/l and bentonite in an amount of 20 g/l.

The results, grouped in Table 2, show, on the one hand, that the samples which do not contain CMC have an efficacy comparable to that of the sample containing CMC. On the other hand, the non-refined scleroglucan samples, which contain a concentration of active substance of 15 to 20% by weight lower than that of the refined scleroglucan samples but 15 to 20% by weight of mycelium in addition, surprisingly have an efficacy comparable to that of the refined samples. The composition containing xanthan is characterised by a considerable increase in the filtrate, which is non-controllable in the present case.

These experiments therefore tend to prove that scleroglucan may be used as viscosity agent and as filtrate-reducing agent, which is not the case for xanthan alone.

TABLE 2

FILTRATION CONTROL

| API Filtrate (ml) 30 min | Composition of the filtered suspensions fresh water - pH 10 |
|---|---|
| 13 | CS6 (7.5 g/l) |
| 13 | CS11 (7.5 g/l) |
| 11 | CS6 (5 g/l) + FB2 Bentonite (20 g/l) |
| 10 | CS6 (5 g/l)1 + FB2 Bentonite (20 g/l) + CMC (4 g/l) |
|  | XB23 (5 g/l) + FB2 Bentonite (30 g/l) |
| 13.5 | CS6 (5 g/l) + FB2 Bentonite (30 g/l) |

EXAMPLE 5

The behaviour of reactive clay pellets was compared with a field mud and a mud containing scleroglucan. The compositions of the muds are given below:

|  | Field mud | Scleroglucan |
|---|---|---|
| Fresh water | 1 l | 1 l |
| Sodium hydroxide qs | pH: 9.6 | pH: 9.8 (about 0.5 g) |
| Bentonite | 30 g | 30 g |
| Antisol 30,000 | 3 g | — |
| Antisol 100 | 1 g | — |
| Low-viscosity CMC | 2 g | — |
| CS6 | — | 4 g |
| FGN | — | 60 g |
| Micronised $CaCO_3$ | — | 20 g |

Antisol 30,000 and Antisol 100 are PAC WOLF WALSRODE products of high and low viscosity respectively.

The composition of the mud containing scleroglucan was defined so as to obtain physical and chemical characteristics similar to those of the field mud. The characteristics of the muds are given in table 3 below:

TABLE 3

|  | Field mud | CS 6 Mud |
|---|---|---|
| Density | 1.09 | 1.07 |
| Salinity | 1 g/l |  |
| pH | 9.6 | 9.8 |
| Solids | 8% | — |
| Filtrate 30 min | 9.6 ml | 9.7 ml |
| Fann 600 | 25.8 Pa | 21 Pa |
| Fann 300 | 16.2 Pa | 14.8 Pa |
| Fann 200 | 12.4 Pa | 12.4 Pa |
| Fann 100 | 7.6 Pa | 9.6 Pa |
| Fann 60 | 5.2 Pa | 8.6 Pa |
| Fann 30 | 3.8 Pa | 6.7 Pa |

TABLE 3-continued

|  | Field mud | CS 6 Mud |
|---|---|---|
| Gels 0 min/10 | 1.4 Pa/2.9 Pa | 5.7 Pa/12.9 Pa |
| AV | $27.10^{-3}$ Pa · s | $22.10^{-3}$ Pa · s |
| PV | $20.10^{-3}$ Pa · s | $13.10^{-3}$ Pa · s |
| YV | 14 × 0,478 Pa | 18 × 0,478 Pa |

Two reconstituted pellets containing 75% by weight of bentonite and 25% of kaolinite were produced. Ageing tests were carried out on these pellets using the two muds in a rotary cell at ambient temperature for 16 h.

In the case of the field mud, doubling of the volume of the pellet and a partial destruction of its circumference were found. The pellet is frayed, fairly soft and not very compact.

In the case of the mud containing scleroglucan, a doubling in volume was found, but the pellet remains regular and intact. The pellet is firmer and more compact than the preceding pellet.

In this table 3 the apparent viscosity is designated AV, the plastic viscosity PV and the "yield value" YV.

In Examples 6, 7, 8 and 9 below, it was attempted to quantify the influence of the biomass on the characteristics (rheology, filtration) of the scleroglucan.

Measurements were carried out on three grades of scleroglucan, that is to say CS11 (reference CS60 below) not containing biomass, the latter having been extracted, CS6 containing 20% by weight of biomass, and CS6 to which 20% of extracted biomass was added (reference CS6-40 below).

As a general rule, it is CS6 which offers the best compromise and therefore the best quality/price ratio.

EXAMPLE 6

Influence of the biomass on the viscosity.

The experiments were carried out using an identical mass of pure product in the solutions, that is to say 1.6 g/l, 3.2 g/l and 4.8 g/l. The scleroglucan is dispersed in fresh water at pH 9. The rheological measurements were carried out in the Carrimed apparatus at atmospheric pressure for various temperatures, that is to say 20° C., 50° C. and 70° C.

Figure 3:
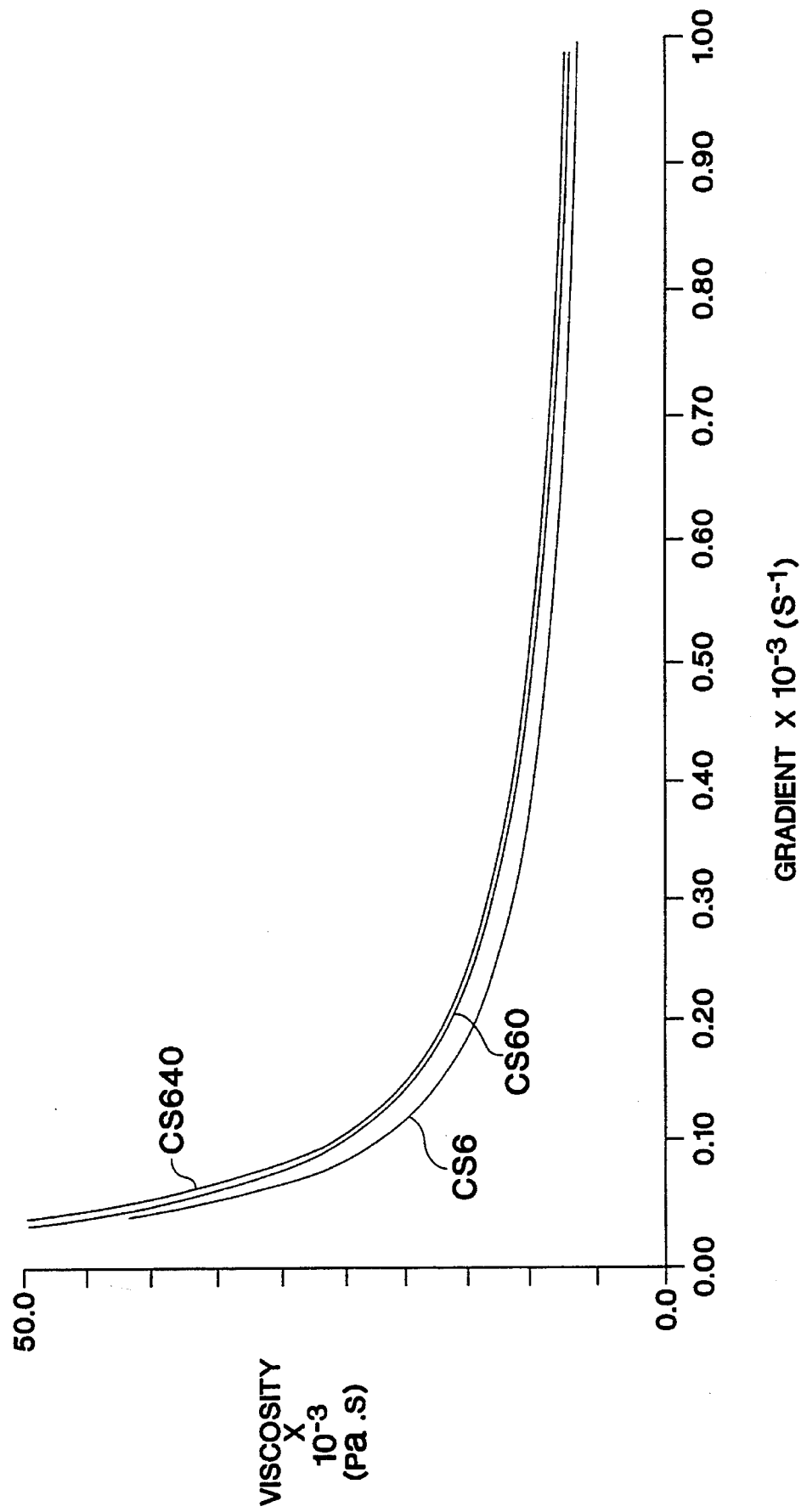
FIG. 3–11 are each a graph of the results produced in Example 6.
Figure 4:
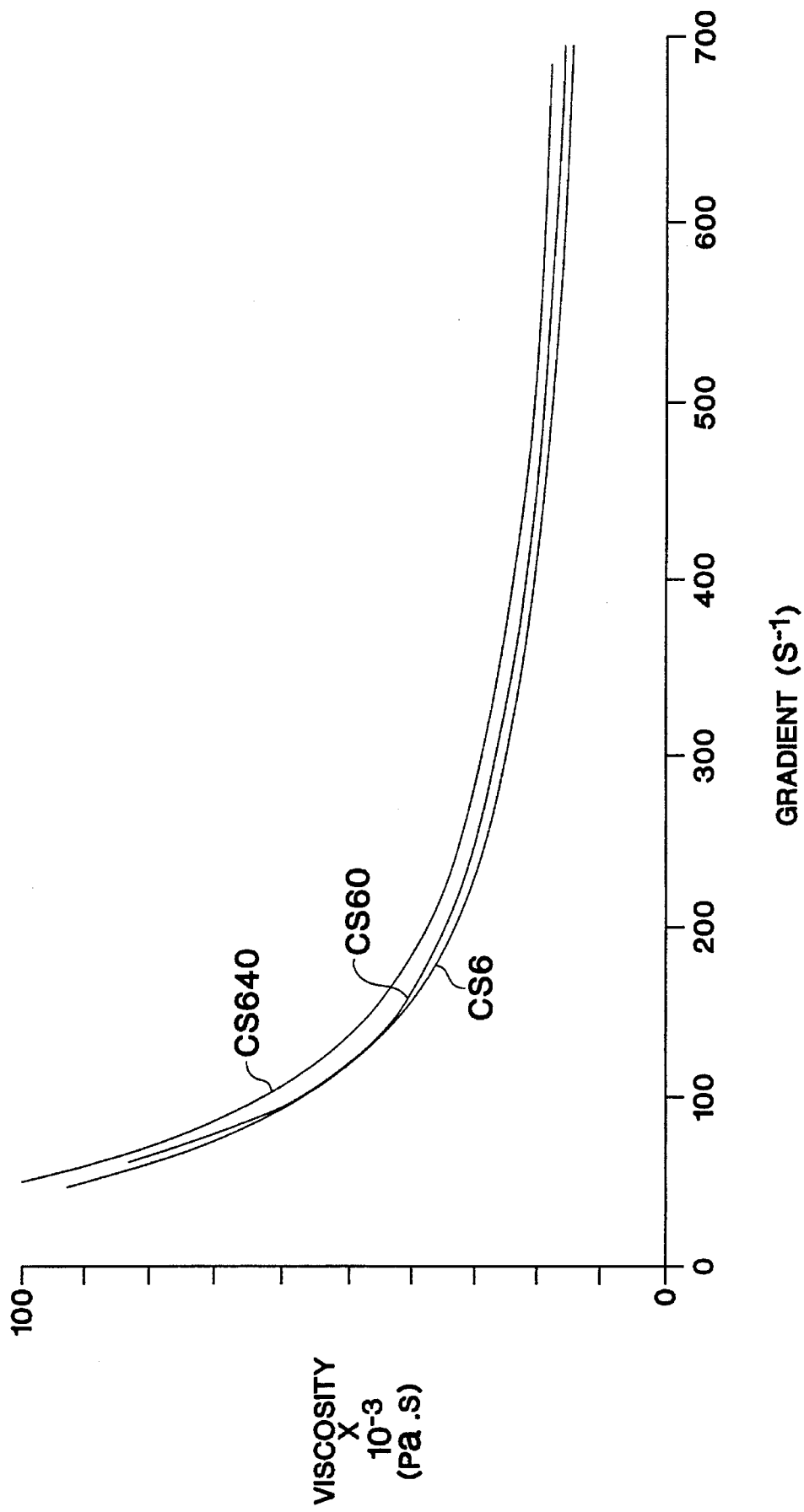
Figure 5:
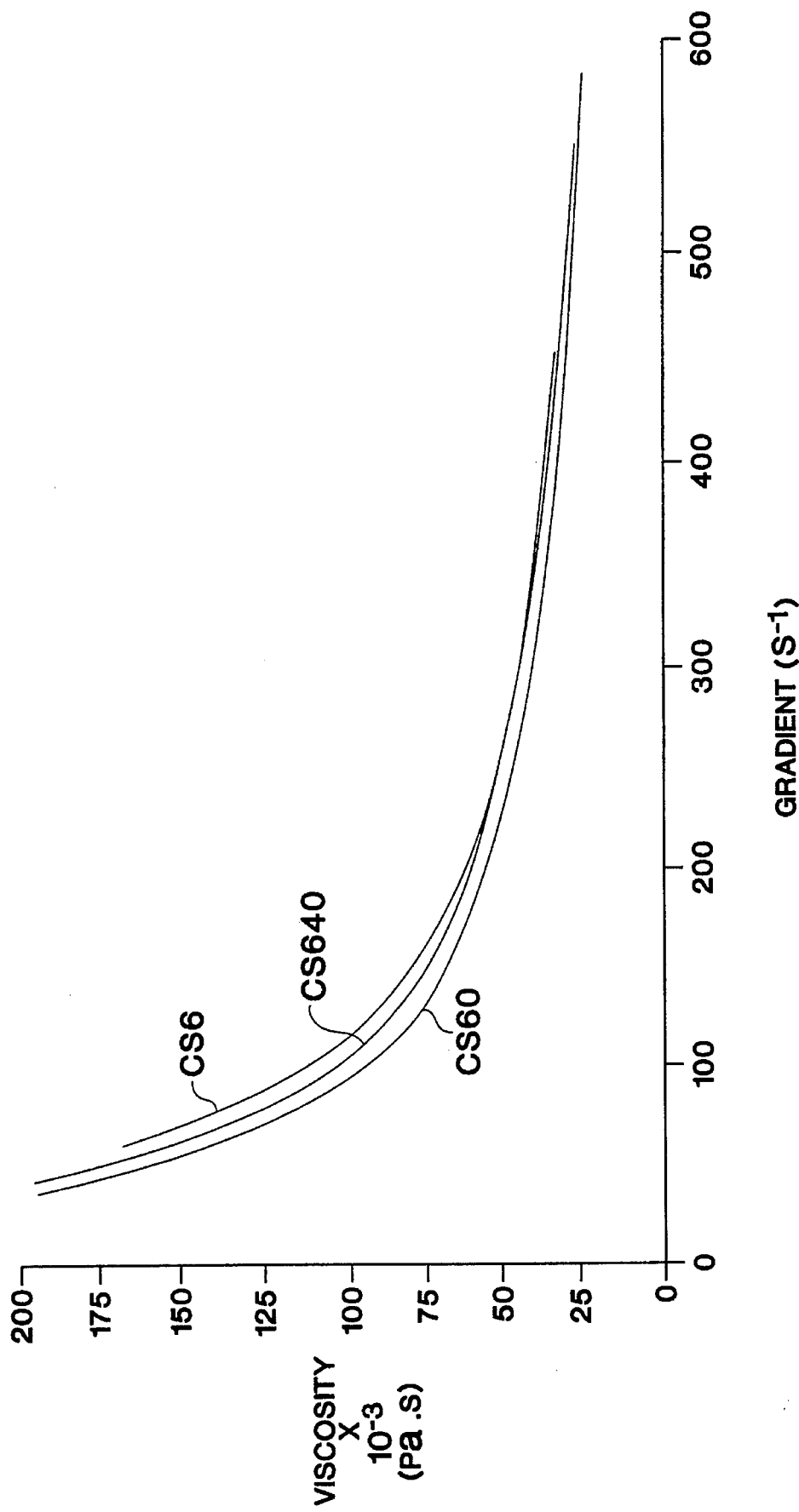
Figure 6:
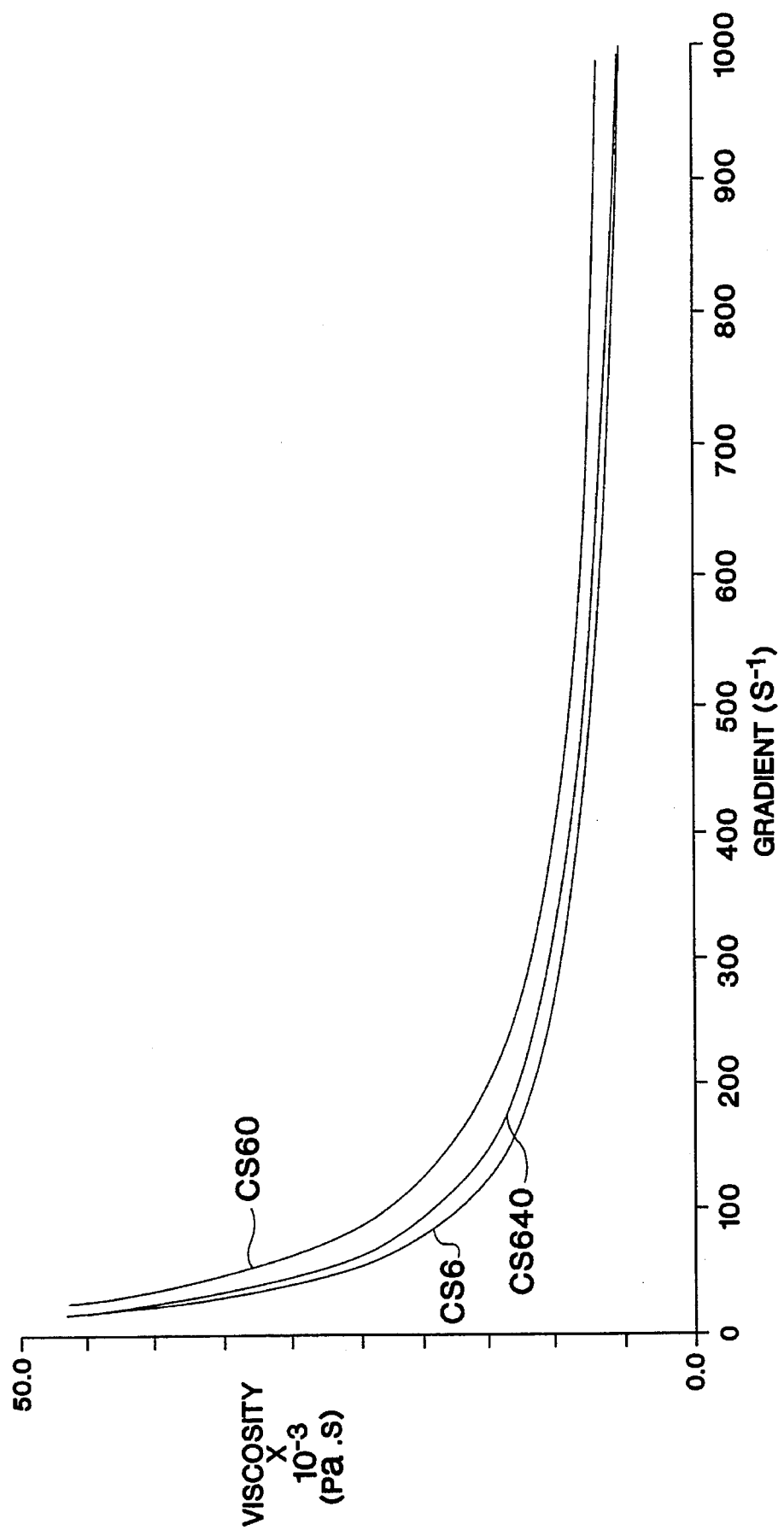
Figure 7:
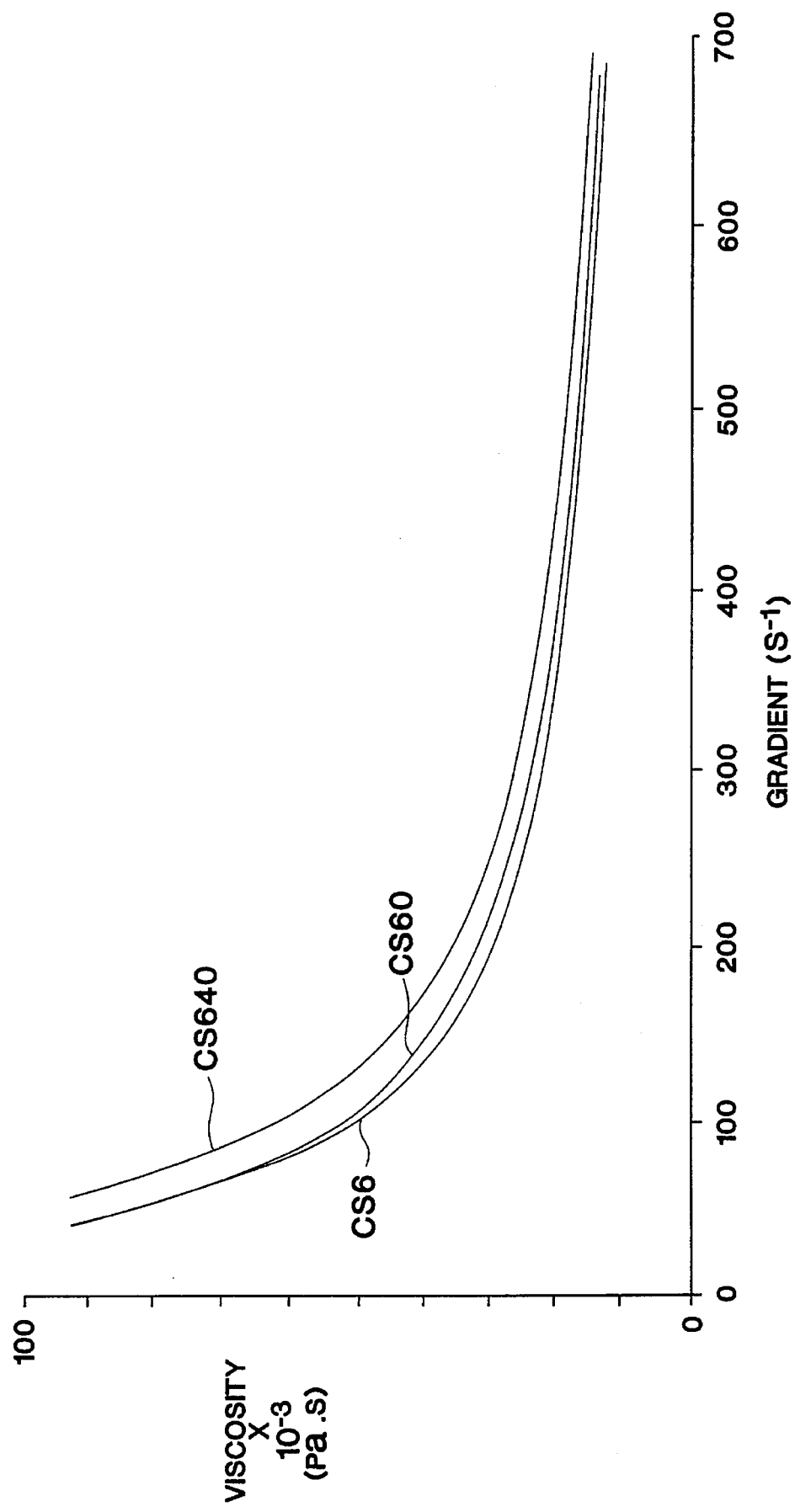
Figure 8:
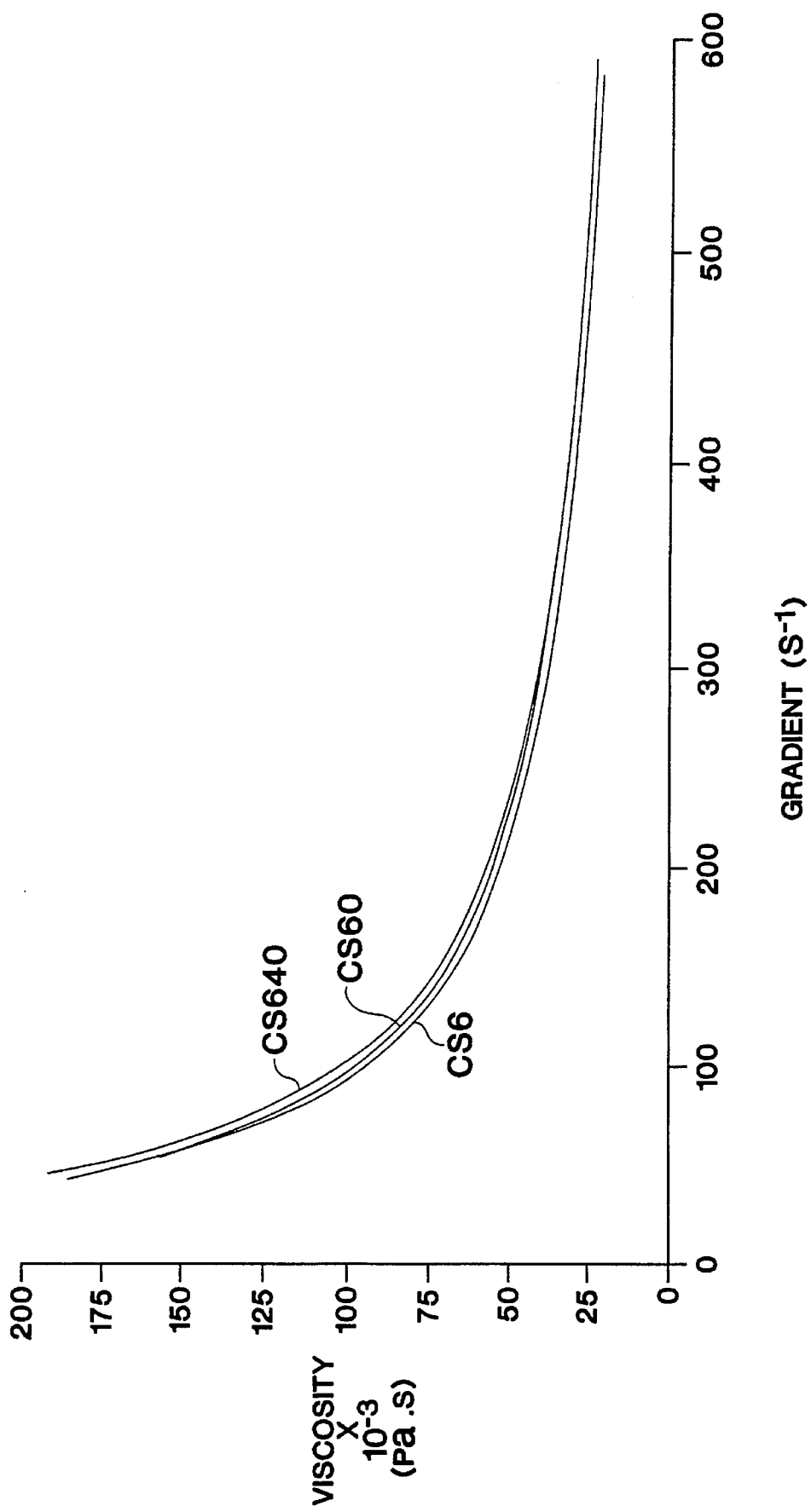
Figure 9:
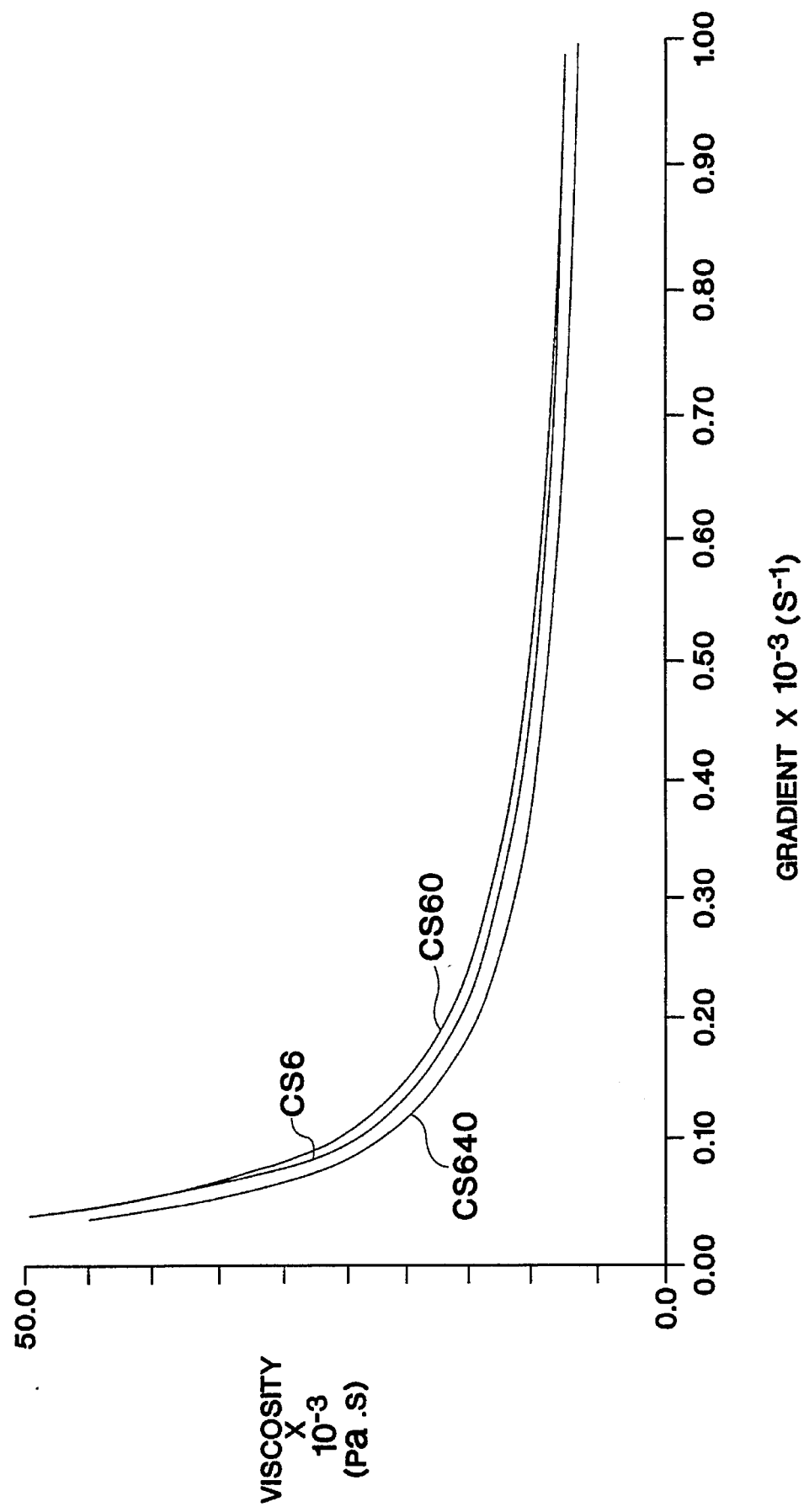
Figure 10:
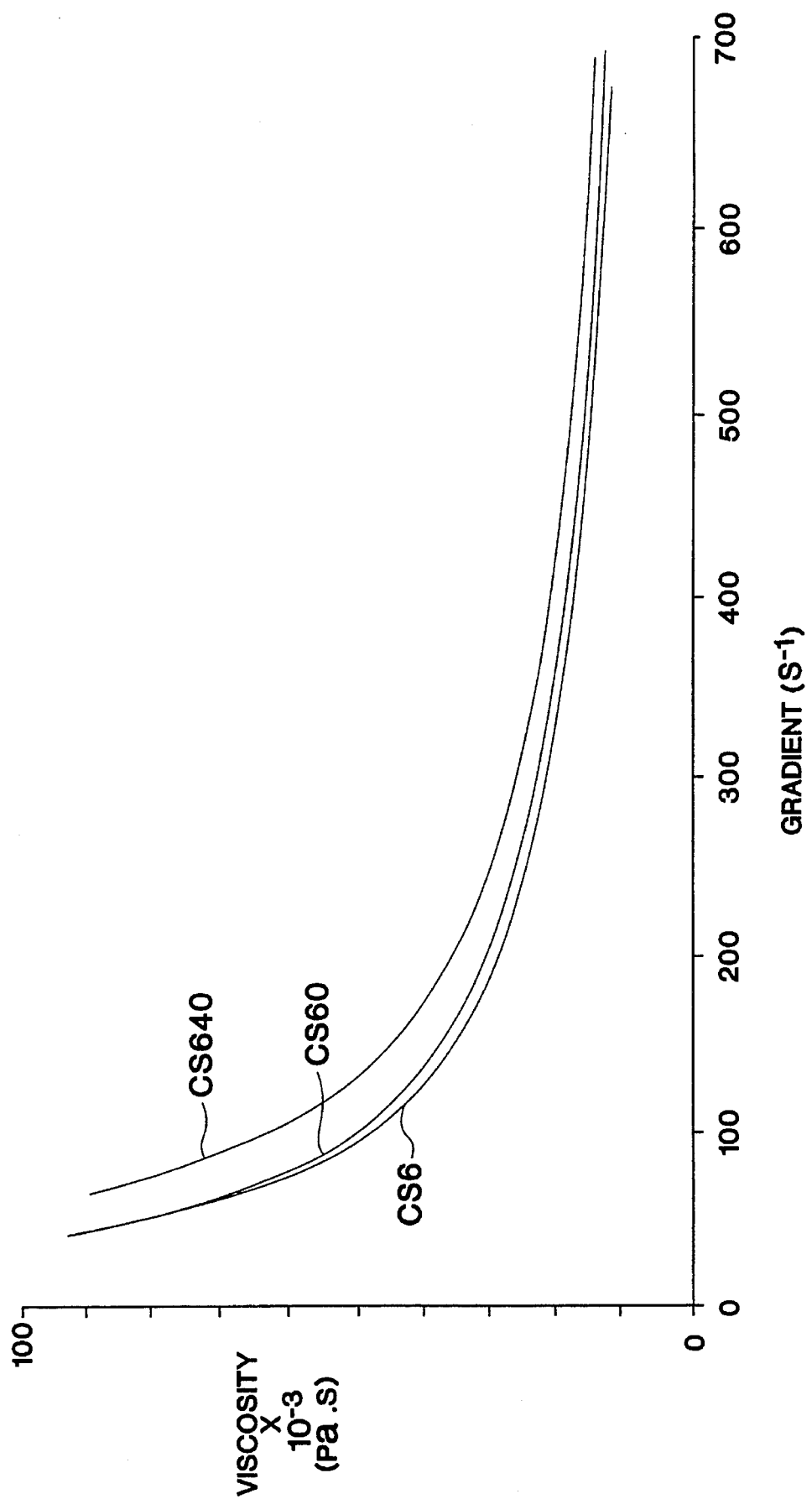
Figure 11:
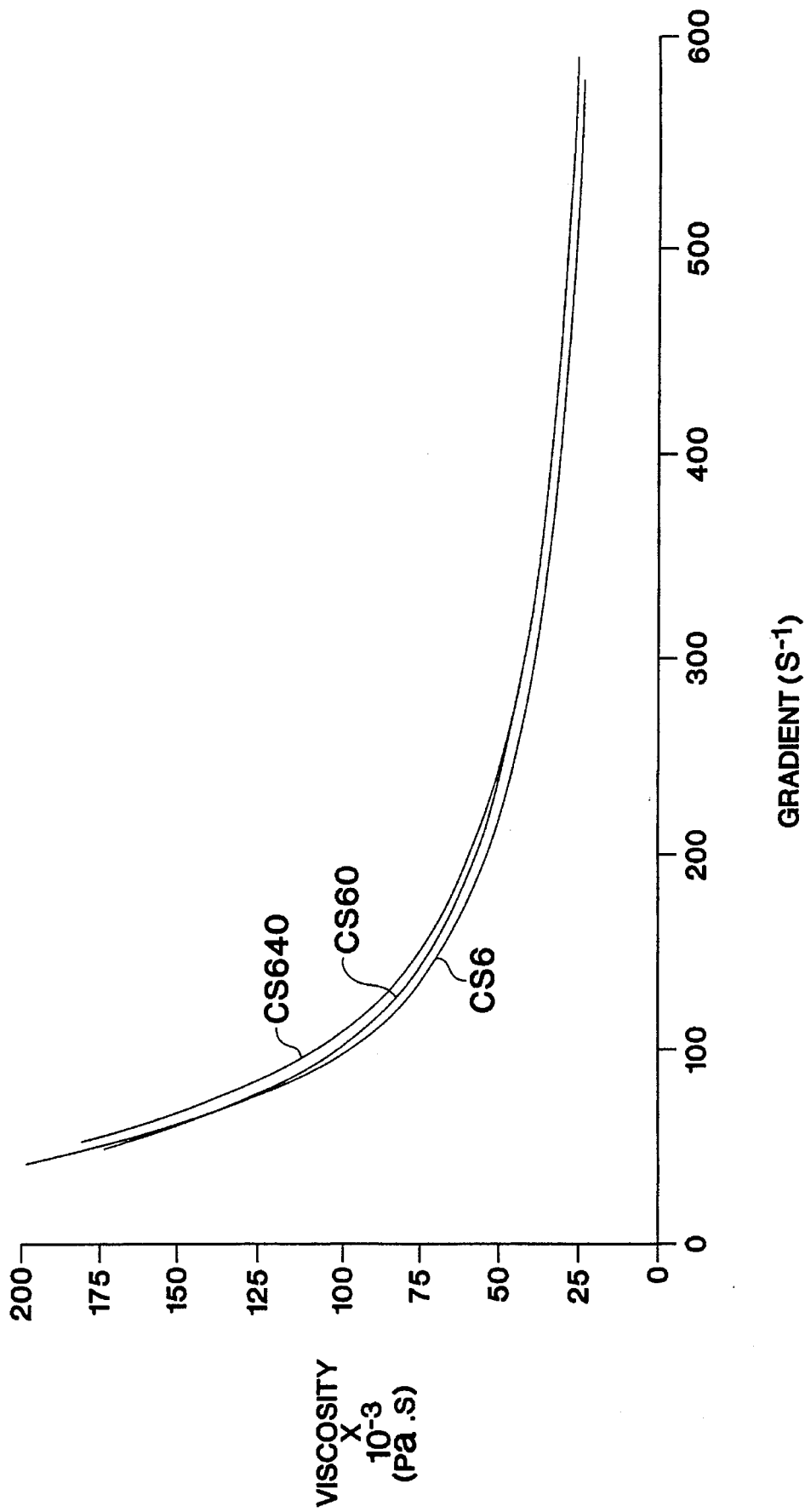

The results are given in FIGS. 3, 4 and 5 (measurements carried out at 20° C. for 1.6 g/l of CS60 (no biomass), 2 g/l of CS6 (20% biomass), and 2.4 g/l of CS640 (40% biomass)), in FIGS. 6, 7 and 8 (measurements carried out at 50° C. for 3.2 g/l of CS60 (no biomass), 4 g/l of CS6 (20% biomass), and 4.8 g/l of CS640 (40% biomass)) and in FIGS. 9, 10 and 11 (measurements carried out at 70° C. for 4.8 g/l of CS60 (no biomass), 6 g/l of CS6 (20% biomass), and 7.2 g/l of CS640 (40% biomass)).

In the solutions containing a high concentration of CS6, the biomass causes a very slight increase in the viscosity. The presence of residual biomass slightly increases the rheological characteristics and also the stability of this rheology at high temperature.

The addition of supplementary biomass has only a limited effect. It could be considered that this is due to the fact that this biomass was subjected to an extraction process.

EXAMPLE 7

Influence of the biomass on the rheological behaviour as a function of temperature and pressure (70 bar).

The three types of scleroglucan are dispersed in fresh water at pH 9. The measurements were carried out using a FANN 70 viscometer for different temperatures, that is to say 70° C., 90° C., 110° C., 130° C. and 140° C. The results are given in Table 4 below. The behaviour of the three solutions is very similar, with, however, a better stability of the CS6. A very good stability of the rheology up to 130° C. will be noted.

The limiting value for use is between 130 and 140° C. for the three types of scleroglucan.

It is found that a 20% concentration of biomass (CS6) creates a filter bed. The biomass therefore improves the control of filtration. The addition of 20% of biomass which has been subjected to an extraction process does not significantly improve the control of the filtrate.

TABLE 4

Composition of the mud:
HP HT 1 : CS60 (0%) 3.2 g/l + fresh water pH 9
HP HT 2 : CS6 (20%) 4 g/l + fresh water pH 9
HP HT 3 : CS640 (40%) 4.8 g/l + fresh water pH 9

| Fann measurements | 70 bar 70° C. | 70 bar 90° C. | 70 bar 110° C. | 70 bar 130° C. | 70 bar 140° C. |
|---|---|---|---|---|---|
| | HP HT 1 | | | | |
| FANN 600 Pa. | 8.84 | 8.1 | 8.1 | 7.2 | 2.15 |
| FANN 300 Pa. | 7.2 | 7.2 | 7.2 | 4.78 | 1.43 |
| FANN 200 Pa. | 6.69 | 6.69 | 6.69 | 4.3 | 0.96 |
| FANN 100 Pa. | 5.74 | 5.74 | 5.5 | 3.82 | 0.48 |
| FANN 60 Pa. | 5.26 | 4.78 | 4.78 | 3.35 | |
| FANN 30 Pa. | 4.3 | 3.82 | 3.82 | 2.87 | |
| FANN 6 Pa. | 3.35 | 2.87 | 2.87 | 1.9 | |
| FANN 3 Pa. | 2.87 | 2.39 | 2.39 | 1.43 | |
| AV Pa · s | $9.25 \times 10^{-3}$ | $8.5 \times 10^{-3}$ | $8.5 \times 10^{-3}$ | $7.5 \times 10^{-3}$ | $2.25 \times 10^{-3}$ |
| PV Pa · s | $3.5 \times 10^{-3}$ | $2 \times 10^{-3}$ | $2 \times 10^{-3}$ | $5 \times 10^{-3}$ | $1.5 \times 10^{-3}$ |
| YV Pa. | 5.5 | 6.21 | 6.21 | 2.39 | 1.19 |
| | HP HT 2 | | | | |
| FANN 600 Pa. | 8.1 | 7.65 | 7.2 | 7.2 | 4.3 |
| FANN 300 Pa. | 7.2 | 6.69 | 6.69 | 6.21 | 3.82 |
| FANN 200 Pa. | 6.69 | 6.21 | 6.21 | 5.74 | 3.35 |
| FANN 100 Pa. | 5.74 | 5.26 | 5.26 | 5.26 | 2.87 |
| FANN 60 Pa. | 4.78 | 3.82 | 3.82 | 3.35 | 2.39 |
| FANN 30 Pa. | 4.3 | 3.82 | 3.82 | 2.87 | 1.9 |
| FANN 6 Pa. | 3.82 | 3.35 | 3.35 | 2.39 | 1.67 |
| FANN 3 Pa. | 3.82 | 3.35 | 3.35 | 1.9 | 1.43 |
| AV Pa · s | $8.5 \times 10^{-3}$ | $8 \times 10^{-3}$ | $7.5 \times 10^{-3}$ | $7.5 \times 10^{-3}$ | $4.5 \times 10^{-3}$ |
| PV Pa · s | $2 \times 10^{-3}$ | $2 \times 10^{-3}$ | $1 \times 10^{-3}$ | $2 \times 10^{-3}$ | $1 \times 10^{-3}$ |
| YV Pa | 6.21 | 5.74 | 6.21 | 5.26 | 3.35 |
| | HP HT 3 | | | | |
| FANN 600 Pa. | 9.56 | 9.08 | 8.6 | 5.74 | 2.39 |
| FANN 300 Pa. | 8.1 | 7.65 | 8.1 | 5.26 | 1.43 |
| FANN 200 Pa. | 7.65 | 7.2 | 7.2 | 4.78 | 0.96 |
| FANN 100 Pa. | 7.2 | 6.69 | 6.69 | 4.3 | 0.96 |
| FANN 60 Pa. | 5.74 | 6.21 | 5.74 | 3.82 | 0.96 |
| FANN 30 Pa. | 5.26 | 5.74 | 5.26 | 3.35 | 0.96 |
| FANN 6 Pa. | 4.78 | 4.78 | 4.78 | 2.87 | 0.96 |
| FANN 3 Pa. | 4.3 | 4.3 | 4.3 | 2.39 | 0.96 |
| AV Pa · s | $10 \times 10^{-3}$ | $9.5 \times 10^{-3}$ | $9 \times 10^{-3}$ | $6 \times 10^{-3}$ | $2.5 \times 10^{-3}$ |
| PV Pa · s | $3 \times 10^{-3}$ | $3 \times 10^{-3}$ | $1 \times 10^{-3}$ | $1 \times 10^{-3}$ | $2 \times 10^{-3}$ |
| YV Pa | 6.69 | 6.21 | 7.69 | 1.43 | 0.48 |

EXAMPLE 8

Filtration study. Influence of the biomass on the API filtrate

The experiment was first carried out using the scleroglucan on its own. The three types of scleroglucan were dispersed in fresh water at pH 9. The measurements were carried out by applying the API standard test described in Example 4, at ambient temperature, for various concentrations of pure product, that is to say 1.6 g/l, 3.2 g/l and 4.8 g/l The results are grouped in the following table 5.

| CS60 Concentration Filtrate | | CS6 Concentration Filtrate | | CS6 40 Concentration Filtrate | |
|---|---|---|---|---|---|
| 1.6 g/l | ∞ | 2 g/l | 25 | 2.4 g/l | 22 |
| 3.2 g/l | 30 ml | 4 g/l | 16 | 4.8 g/l | 17 |
| 4.8 g/l | 50 ml | 6 g/l | 12 | 7.2 g/l | 13 |

EXAMPLE 9

Filtration study. Influence of the biomass on the API filtrate

This time the filtrate measurements were carried out on fresh water solutions at pH 9 containing 30 g/l of WYOMING W100 bentonite, in which solutions CS60, CS6 and CS640 were dispersed in an amount of, respectively, 3.2 g/l, 4 g/l and 4.8 g/l The results are grouped in the following table 6.

| CS60 Concentration Filtrate | | CS6 Concentration Filtrate | | CS640 Concentration Filtrate | |
|---|---|---|---|---|---|
| 3.2 g/l | 13 ml | 4 g/l | 12 ml | 4.8 g/l | 12 ml |

The results can be compared with those of Example 8. It is found that in the presence of a filter bed the influence of the biomass is not significant.

We claim:

1. A base composition for a water-based drilling mud comprising a mixture of (i) water, (ii) scleroglucan, and (iii) a non-reactive inorganic colloidal solid, wherein said colloidal solid is contained in an amount greater than 0 but less than or equal to 50 g/l and wherein said scleroglucan has been produced by carrying out fermentation of a producing fungus and said composition further comprises at least 15% by weight of the mycelium of said producing fungus.

2. The composition according to claim 1, wherein said scleroglucan is contained in an amount between 1 g/l and 10 g/l.

3. The composition according to claim 1, wherein said base composition contains 2 g/l to 5 g/l of non-refined scleroglucan.

4. The composition according to claim 1, wherein said inorganic colloidal solid is bentonite.

5. The composition according to claim 1, wherein said water is selected from fresh water, brine and water to which a salt has been added.

6. The composition according to claim 1, which further comprises an alkaline compound in an amount sufficient to obtain a pH of said composition of between 8 and 10.

7. A water-based drilling mud, consisting essentially of the base composition according to claim 1 or 6.

8. A process for drilling petroleum wells which comprises applying a drilling mud which contains the composition according to claim 1 to the drill.

9. A process for drilling a mine which comprises applying a drilling mud which contains the composition according to claim 1 to the drill.

10. A process for drilling a water well which comprises applying a drilling mud which contains the composition according to claim 1 to the drill.

11. The composition according to claim 1, which further comprises calcium carbonate in an amount of up to 50 g/l.

12. The composition according to claim 1, which further comprises a bactericide.

13. The composition according to claim 12, wherein said bactericide is contained in an amount up to 0.5% by weight.

14. The composition according to claim 11 which further comprises a bactericide.

15. The composition according to claim 14, wherein said bactericide is contained in an amount up to 0.5% by weight.

* * * * *